(12) United States Patent
Laag et al.

(10) Patent No.: US 6,444,055 B1
(45) Date of Patent: Sep. 3, 2002

(54) COMPOSITE MATERIAL WITH A HIGH PROPORTION OF INTERMETALLIC PHASES, PREFERABLY FOR FRICTION BODIES

(75) Inventors: Rainhard Laag, Bopfingen-Kerkingen; Gunther Schwarz, Tuttlingen; Manfred Heinritz, Aalen, all of (DE)

(73) Assignee: Schwabische Huttenwerke GmbH, Aalen (DE)

( * ) Notice: Subject to any disclaimer, the term of this patent is extended or adjusted under 35 U.S.C. 154(b) by 0 days.

(21) Appl. No.: 09/284,350

(22) PCT Filed: Aug. 8, 1998

(86) PCT No.: PCT/DE98/02280
§ 371 (c)(1),
(2), (4) Date: Aug. 9, 1999

(87) PCT Pub. No.: WO99/09334
PCT Pub. Date: Feb. 25, 1999

(30) Foreign Application Priority Data

Aug. 14, 1997 (DE) .......................................... 197 35 217

(51) Int. Cl.[7] .................. F16D 69/02; F16D 65/12; C21D 5/00; C22C 37/04; C22C 37/10
(52) U.S. Cl. ..................... 148/321; 420/28; 188/218 R; 188/218 XL
(58) Field of Search ............................. 75/231; 106/36; 148/321; 420/28; 188/218 R, 218 XL

(56) References Cited

U.S. PATENT DOCUMENTS

| 4,280,935 | A | * | 7/1981 | Ogiwara |
| 4,684,505 | A | * | 8/1987 | Brinegar et al. |
| 4,961,903 | A | * | 10/1990 | McKamey et al. |
| 5,320,802 | A | * | 6/1994 | Liu et al. |
| 5,425,821 | A | * | 6/1995 | Kuru et al. |
| 5,595,706 | A | * | 1/1997 | Sikka et al. |
| 6,030,472 | A | * | 2/2000 | Hajaligol et al. |

FOREIGN PATENT DOCUMENTS

GB  1 316 186  * 5/1973

* cited by examiner

Primary Examiner—Deborah Jones
Assistant Examiner—Jason Savage
(74) Attorney, Agent, or Firm—Fish & Richardson P.C.

(57) ABSTRACT

A metallic cast material for friction bodies in acceleration or deceleration devices, particularly in the brake or clutch systems of road or rail vehicles, is produced from the iron/aluminum/carbon tertiary group so that the material is largely in the intermetallic phase having an ordered crystal lattice structure, and free carbon in lamellar, sphoroidal or vermicular form is present therein. The proportion of aluminum in the alloy is between 20 and 28% by weight, preferably 24% by weight. The material may be melted and cast open to the air. Solid or internally ventilated brake discs are mentioned as appropriate friction bodies. The friction bodies are lighter, more resistant to corrosion and wear, have a higher alternate bending fatigue strength and are at least as easily workable as previously known friction bodies made from ferrous materials.

27 Claims, 4 Drawing Sheets

COMPOSITE MATERIAL WITH A HIGH PROPORTION OF INTERMETALLIC PHASES, PREFERABLY FOR FRICTION BODIES

BACKGROUND

The object of the invention is to create a ferrous material for friction bodies that has the known advantages of previous cast materials, such as heat resistance, low risk of fire cracking, acoustic damping and measured lubrication, is of lower density, less prone to corrosion and, while being harder, is more workable than materials produced in accordance with the prior art. The properties that such a material must have and the measures required to produce it result from the characterising parts of the claims.

Materials of the type according to the invention are particularly suitable for use in brake discs, brake drums or clutch discs in road or rail transport systems, but are generally usable anywhere that, for acceleration or deceleration operations, a transmission of power is required between two bodies, at least one of which performs a translational or rotational motion relative to the other body. The coefficients of friction between two friction surfaces are constant or variable according to the design.

Drum brakes, multiple-disc brakes and disc brakes are used in brakes for road or rail transport systems. The discs used in disc brakes are either solid or internally ventilated, depending on the thermal load. They are largely manufactured from cast iron conforming to DIN 15437 with lamellar graphite (e.g. GG 25) or spheroidal graphite (e.g. GGG 40, GGG 50 or GGG 60), cast steel GS 60, structure) steel St 52-3 or, less frequently, heat treatable steels C 45 or 42CrM04. The use of grey cast iron with lamellar graphite (GG 25) has proven particularly advantageous. The flat form of graphite present therein produces the desired high thermal conductivity. The free carbon required to form graphite is obtained by alloying the pig iron with silicon. In so doing, every effort should be made to keep the silicon content as low as possible since silicon reduces the thermal conductivity of iron. Otherwise unalloyed, high carbon cast iron materials have proven particularly suitable. Unalloyed cast iron results in fewer failures of brake discs due to fire cracking and dimensional changes due to warping than low alloy cast iron or cast steel. The braking behaviour is also the same or better. There is less wear, despite the reduced hardness, and the brake discs are less prone to drumming and rubbing. The thermal conductivity of a GG 15 MC derived from GG 25, for example, is less than 50 W/mK. This low-cost material is also easily machinable.

The material GG 20 is often used for brake discs. Its chemical composition is shown in Table 1 below.

| Element | Fr | C | Si | Mn | P | S | Cu |
|---|---|---|---|---|---|---|---|
| % by weight | Remainder | 3.6 | 2.0 | 0.7 | 0.01 | 0.1 | 0.3 |

A low Mo, Cr and Ni content may be added by alloying in order to increase the strength and stabilise the perlite. According to DIN 1690, GG 20 has a tensile strength of 200 to 300 N/mm$^2$, which exceeds the tensile strength of at least 150 N/mm$^2$ desired for use. The Brinell hardness of the material is 180 to 220 MB.

However, the disadvantage of all the previously known grey cast iron materials for friction bodies is that the elongation at break is too low. Alloys of grey cast iron with spheroidal graphite or cast steel or, less frequently, heat treatable steels are used for many applications, particularly if heating is uneven over the friction surface, i.e. so-called hot spots occur. This does not, however, have a positive effect on the other disadvantage, namely the relatively high susceptibility to corrosion of the material. Finally, the high density of friction bodies manufactured from the material described above, the fast abrasion, which is particularly noticeable when braking large masses such as trucks or rail vehicles, and the cost of expensive alloying elements should all be mentioned as further disadvantages.

Several approaches may be taken to improve the properties of today's iron based friction body materials. Alloying elements may be considered in order to improve the corrosion properties. Expensive alloying materials cause an undue increase in the cost of materials, however. Weight can be reduced primarily through the use of a lighter alloy. If aluminum is used as the basic material, the corrosion behaviour is improved, but the wearing properties deteriorate drastically and the operating temperature is limited.

All the aforementioned disadvantages essentially result from the microstructure of the material, since the matrix consists of a mixed Fe/C-based crystal which is frequently ferritic or perlitic or martensitic. The unordered arrangement of the metal atoms is characteristic of such mixed crystals. The bonds therebetween are almost exclusively metallic. On the other hand, alloys with intermetallic compounds offer a good alternative. Intermetallic compounds have ordered crystal lattices with a high proportion of ionic or covalent bonds. Although they consist only of metallic elements, they have the properties of oxide, carbide or nitride ceramics, are characterised by their high melting temperatures and very high corrosion resistance. It therefore appeared conceivable that the properties of friction bodies could be improved substantially through the use of an intermetallic compound. The intermetallic compounds considered were those based on iron and aluminium, in particular, on account of the weight reduction which are also desired.

There were, however, considerable reservations concerning iron/aluminium compound since they were generally thought to be difficult to produce, brittle and difficult to machine. In this respect, reference is made to the information sheets from the Zentrale fur Gubverwendung (the central office for cast iron usage), sheet no. 1105/1 (9th edition 1968), for example, which still reflects the prior art today. In this information sheet, aluminum-alloyed cast irons with a low aluminium content (4 to 7% Al) are described as having low impact bending strength and low workability and those with a high aluminium content of 22 to 30% Al are also described as having low impact bending strength and even poorer workability. Parts for furnaces, apparatuses for sulphur distillation and for the manufacture of sodium sulphide, smelting crucibles, heating plates and resistor packs are mentioned as typical applications, but not structural components subject to mechanical stresses. It is noted at several points in the publication that although they have good scaling resistance, they have the disadvantages of being difficult to manufacture, frequently poorly workable and brittle.

SUMMARY

In contrast to the disadvantages described above; and, however, the experiments on which the invention is based demonstrated that these disadvantages do not occur, which corresponded to the result of prior theoretical consideration.

Considerably higher corrosion resistance was observed. The impact bending strength at least corresponded to that of conventional materials and the workability was even improved.

DESCRIPTION

Figure 1:
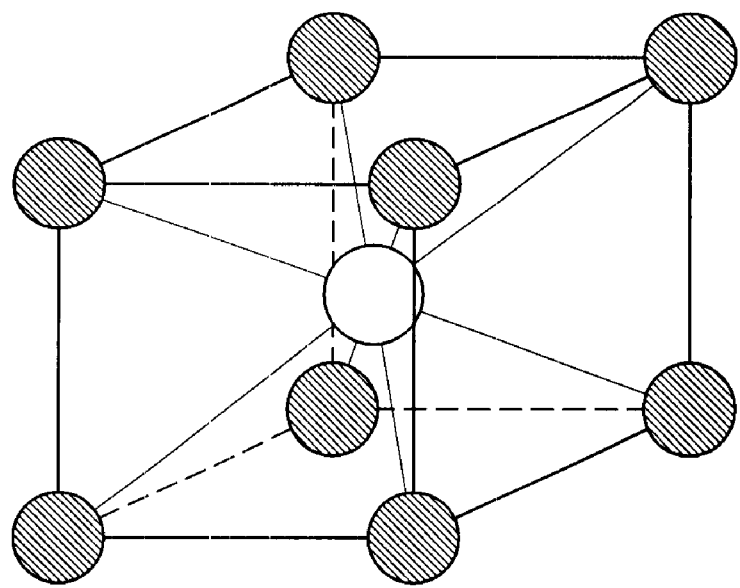
FIG. 1 is an illustration of a metallic lattice structure of the binary system Fe-Al.
Figure 2:
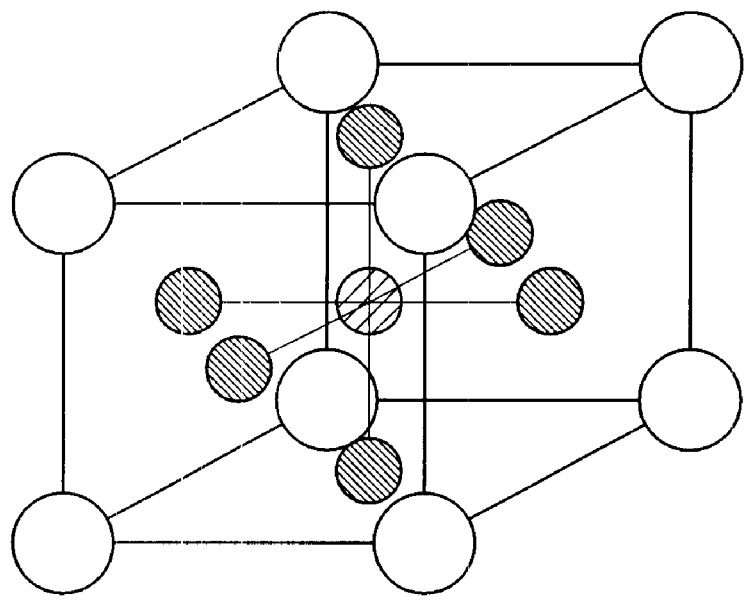
FIG. 2 is an illustration of a metallic lattice structure of the ternary system Fe-Al-C.

The presence of lamellar carbon in as uniform and fine a form as possible is essential in order to obtain the properties of the material intended to achieve the object of the invention. The methods normally used to this end in iron/carbon metallurgy cannot be applied to the iron/aluminium system. The addition of larger amounts of silicon, in particular, is undesirable since silicon assumes positions in the crystal lattice of the intermetallic phase that should be occupied by aluminum. Specific experiments were therefore carried out to determine whether the dispersion of the carbon could be influenced by varying the proportions in which the iron and aluminum were mixed. Examination of the metallic lattice structures of the binary and ternary systems Fe-Al and Fe-Al-c, as illustrated in FIGS. 1 and 2, resulted in similar thoughts. In FIGS. 1 and 2, the lattice sites of the iron atoms are black and those of the aluminium atoms are shown as open circles. The hatched circle in FIG. 2 shows the position of the carbon.

Figure 3:
FIG. 3 is an illustration of a microstructure of FELAMCAL containing FeAl and dispersed carbon.
Figure 4:
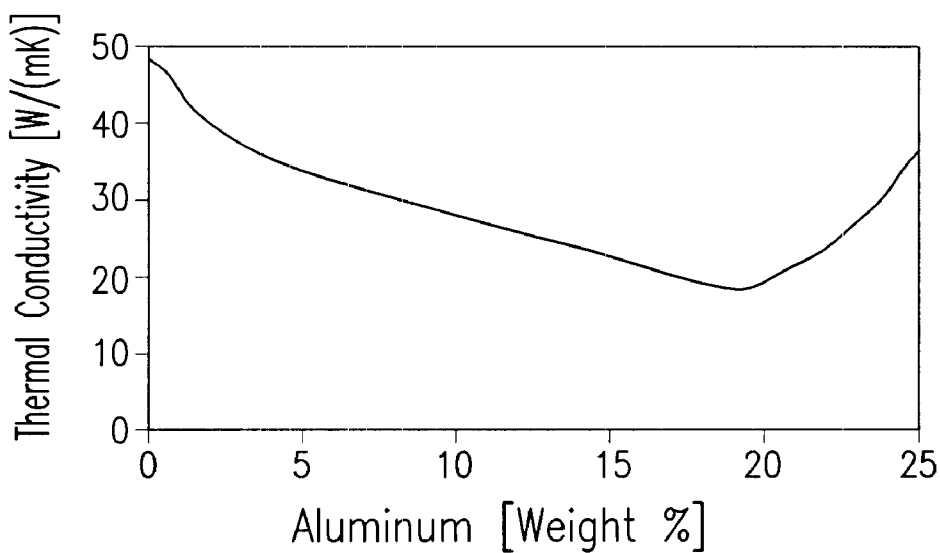
FIG. 4 is a graph of thermal conductivity as a function of aluminum content.
Figure 5:
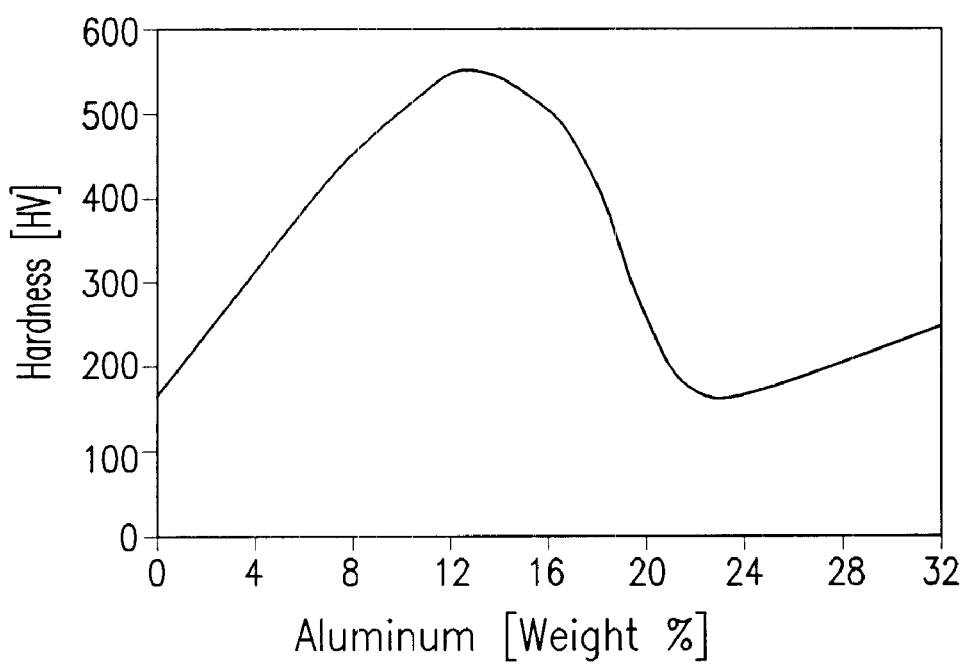
FIG. 5 is a graph of hardness as a function of aluminum content.

The experiments carried out resulted in the following substantial changes to the material structure: with the addition of up to 4% by weight of aluminium to the alloy, the material produced behaves rather like cast iron with respect to carbon dispersion, i.e. the specific addition of silicon was needed in order to obtain fine lamellar graphite. As the percentage by weight of aluminium increased, the carbide took the form of a perovskite crystal, face-centred cubic with the carbon atom body-centred in the elementary cell. See FIG. 2. Once the proportion of aluminum exceeds approximately 17% by weight, the crystalline structure is so tightly packed with aluminium that the inclusion of carbon falls off increasingly, with the result that the carbide proportion decreases and free carbon is dispersed. In the presence of a moderate proportion of silicon (up to 1% by weight), the carbon becomes lamellar. Finally, the optimum structure for the desired purpose, in which carbon atoms included in the lattice are dispersed by the reduction in the size of the octahedral gap, occurs at approximately 24% by weight of aluminum. An illustration of the microstructure thus obtained is shown in FIG. 3, in which the white areas consist of FeAl according to FIG. 1 and the elementary carbon (black) from FIG. 2 has dispersed. The material thus obtained, hereafter designated as FELAMCAL, has all the desired advantages with respect to thermal conductivity, lubrication, freedom from fire cracking, ductility at room temperature, machinability, corrosion resistance and lighter weight. The values obtained for the thermal conductivity of the iron/aluminum alloy and its hardness curve are shown in FIGS. 4 and 5. FIG. 4 represents the thermal conductivity as a function of the aluminium content and FIG. 5 shows the hardness curve.

Figure 6:
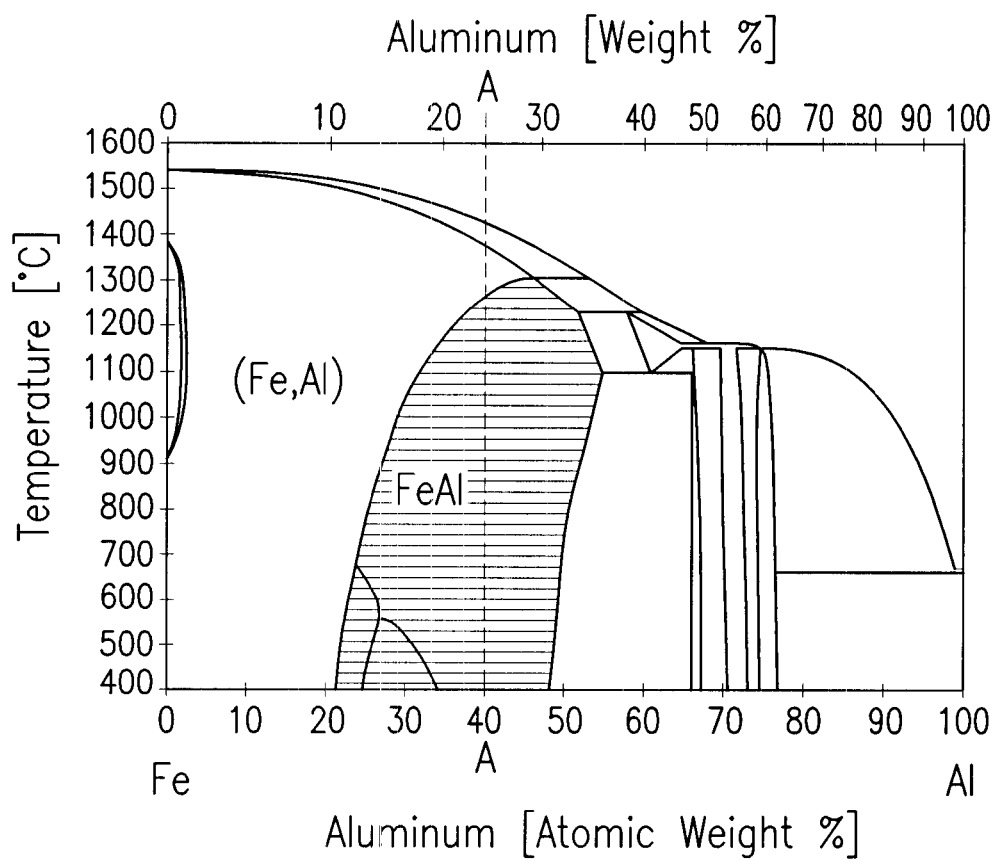
FIG. 6 is a graphical representation of temperature of forming FELAMCAL as a function of atomic weight percent and weight percent of aluminum.

Reference is also made to FIG. 6 (representation of the iron/aluminium binary system) in order to explain the metallurgical context underlying the grades of material developed in greater detail. The vertical line A—A at 24% by weight or 40% by atomic weight of aluminum refers to the range within which FELAMCAL is obtained. In the region of FIG. 6 labeled FeAl, the alloy is largely in the intermetallic phase and contains approximately 20% to 28% by weight aluminum, more particularly approximately 24% by weight aluminum, and up to 1% by weight silicon and up to approximately 3% by weight carbon, in addition to iron.

A method of manufacturing friction bodies from FELAMCAL is described below by way of example for the alloy with 24% by weight aluminium.

The iron fraction in the melt is melted from pig iron, low alloy scrap steel or recycled material consisting of grey cast iron with lamellar graphite or grey cast iron with spheroidal graphite. The melting takes place either in a cupola furnace or in an electric furnace open to the air. A low copper content of less than 0.5% should be observed when selecting the starting material. The proportion of aluminium in the melt is obtained from either metallurgical aluminium or scrap aluminium, wherein a low silicon content of no more than 1% should be observed. The alloying takes place in an acidic lined furnace by the addition of solid aluminium to liquid cast iron. This effectively avoids the undesirable absorption of oxygen. An exothermic reaction occurs during the alloy formation.

The melt is heated to 1600° C., has a temperature of approximately 1540° C. before casting and is poured off beneath the slack. This results in homogeneous flow and complete filling of the sand molds which are produced using conventional manufacturing methods. Cooling also takes place using the conventional method without special measures such as reducing or increasing the cooling speed or the like. It is also not necessary to fully exclude the air. As a consequence, the method may be applied in a conventional foundry with few additional measures.

Other ideas concerning other intermetallic compounds that were pursued did not result in any more favorable results. It is theoretically conceivable to produce intermetallic compounds based on iron and copper or iron and nickel. However, these ideas were not considered further due, in particular to the disadvantages of their methods (hazard to personnel from toxins) or their high costs. In addition, the desired reduction in weight could not be obtained with such intermetallic compounds.

If appropriate known metallurgic methods are used to influence the form in which the excess carbon is dispersed in the alloy (e.g. addition of magnesium to the alloy), it is also conceivable to produce intermetallic compounds of the iron/aluminium/carbon system with spheroidal (spheroidal cast iron) or vermicular carbon. The fields of application for such bodies thus produced include mechanical components for motor housings, turbines and chemical apparatuses, for example.

It was also identified that FELAMCAL, like cast iron materials, is suitable for the further improvement of the wear resistance or for specific adaptation of the cold friction coefficient by the addition of carbides or oxides. To this end, carbide formers, such as molybdenum, chromium, hafnium, titanium or tantalum or oxides of erbium or zircon, in each case in proportions of less than 5% by weight, are added to the alloy in a known manner.

The melt obtained using the method described above is more viscous than the conventional high carbon cast irons that are preferred for the production of friction bodies. Larger gate cross-sections are therefore required in the casting mold. A central in-gate for each friction body from the upper part of the mold has proven particularly advantageous.

As illustrated above, FELAMCAL was developed mainly as an improved alternative to known friction materials. It is clear that use of the material is not limited to such products. It may be used anywhere that the described properties are needed since it is an easily machinable cast material that can be produced without substantial additional equipment or steps of the method and the manufacturing costs are favorable.

Of course, other procedures can be used as the manufacturing method for FELAMCAL, such as melting the solid starting metals together or other methods that are conventionally known to the foundry specialist.

What is claimed is:

1. A metallic cast material of a friction body in a brake system or a clutch system of a vehicle for transmitting power in acceleration or deceleration devices, wherein the cast material is an alloy of the iron/aluminum/carbon ternary group, and the alloy is substantially in an intermetallic phase comprising an ordered crystal lattice structure and free carbon in lamellar form.

2. A metallic cast material according to claim 1, wherein the material comprises 20 to 28% by weight aluminum, up to 1% by weight silicon, up to 3% by weight carbon, and iron.

3. A metallic cast material according to claim 2, wherein the material comprises 24% by weight aluminum.

4. A metallic cast material according to claim 2, further comprising at least one carbide-forming element selected from the group consisting of molybdenum, chromium, hafnium, titanium and tantalum, and the carbide-forming element is alloyed with the cast material in a proportion of less than 5% by weight.

5. A metallic cast material according to claim 2, further comprising an oxide-forming element selected from the group consisting of erbium and zirconium, wherein the oxide-forming element is alloyed with the cast material in proportions of less than 5% by weight.

6. A metallic cast material according to claim 1, wherein the alloy is substantially in an intermetallic phase comprising an ordered crystal lattice structure and free carbon in spheroidal form.

7. A metallic cast material according to claim 6, further comprising at least one carbide-forming element selected from the group consisting of molybdenum, chromium, hafnium, titanium and tantalum, wherein the carbide-forming element is alloyed with the cast material in a proportion of less than 5% by weight.

8. A metallic cast material according to claim 6, further comprising an oxide-forming element selected from the group consisting of erbium and zirconium, wherein the oxide-forming element is alloyed with the cast material in proportions of less than 5% by weight.

9. A metallic cast material according to claim 1, wherein the alloy is substantially in an intermetallic phase comprising an ordered crystal lattice structure and free carbon in vermicular form.

10. A metallic cast material according to claim 9, further comprising at least one carbide-forming element selected from the group consisting of molybdenum, chromium, hafnium, titanium and tantalum, wherein the carbide-forming element is alloyed with the cast material in proportion of less than 5% by weight.

11. A metallic cast material according to claim 9, further comprising an oxide-forming element selected from the group consisting of erbium and zirconium, wherein the oxide-forming element is alloyed with the cast material in proportions of less than 5% by weight.

12. A metallic cast material according to claim 1, further comprising at least one carbide-forming element selected from the group consisting of molybdenum, chromium, hafnium, titanium and tantalum, wherein the carbide-forming element is alloyed with the cast material in a proportion of less than 5% weight.

13. A metallic cast material according to claim 1, further comprising an oxide-forming element selected from the group consisting of erbium and zirconium, wherein the oxide-forming element is alloyed with the cast material in proportions of less than 5% by weight.

14. A metallic cast material according to claim 1, further comprising an oxide-forming element selected from the group consisting of erbium and zirconium, wherein the oxide-forming element is alloyed with the cast material in proportions of less than 5% by weight.

15. A friction body for transmitting power in acceleration or deceleration devices, wherein the friction body comprises a metallic cast material comprising an alloy of the iron/aluminum/carbon ternary group, wherein the alloy comprises between approximately 20% and 28% by weight aluminum and is substantially in an intermetallic phase.

16. A friction body according to claim 15 wherein the friction body comprises a brake disc.

17. A brake disc according to claim 16, wherein the brake disc is internally ventilated.

18. A friction body according to claim 15 wherein the friction body comprises a brake drum.

19. A metallic cast material according to claim 15, further comprising at least one carbide-forming element selected from the group consisting of molybdenum, chromium, hafnium, titanium and tantalum, wherein the carbide-forming element is alloyed with the cast material in a proportion of less than 5% by weight.

20. A friction body for transmitting power in acceleration or deceleration device, wherein the friction body comprises a metallic or ceramic base body to which a friction layer is applied by thermal spray metallization, rolling, or friction welding, the friction layer is a metallic material comprising an alloy of the iron/aluminum/carbon ternary group, wherein the alloy comprises between approximately 20% and 28% by weight aluminum and is substantially in an intermetallic phase.

21. A friction body according to claim 20 wherein the friction body comprises a brake disc.

22. A friction body according to claim 20, wherein the friction body comprises a brake drum.

23. A metallic cast material according to claim 20, further comprising at least one carbide-forming element selected from the group consisting of molybdenum, chromium, hafnium, titanium and tantalum, wherein the carbide-forming element is alloyed with the cast material in a proportion of less than 5% by weight.

24. A method of manufacturing a metallic material of a friction body for transmitting power in acceleration and/or deceleration devices, the material comprising an alloy of the iron/aluminum/carbon ternary group in an intermetallic phase, the method comprising adding the aluminum in a solid state to the iron while the iron is in a liquid state, wherein the alloy comprises between approximately 20% and 28% by weight aluminum.

25. A method according to claim 24, wherein the metallic material is melted and cast in an environment that is open to air.

26. A method according to claim 24, wherein the metallic cast material is melted in a furnace having an acidic lining.

27. A method of manufacturing a friction body according to claim 24, wherein the casting mold of the individual friction body is filled centrally through an in-gate from the upper part of the mold.

* * * * *